(12) United States Patent
Lee et al.

(10) Patent No.: US 8,316,214 B2
(45) Date of Patent: Nov. 20, 2012

(54) DATA ACCESS TRACING WITH COMPRESSED ADDRESS OUTPUT

(75) Inventors: Li Lee, Brookline, MA (US); Ramesh Jandhyala, Cedar Park, TX (US); Srikanth Kannan, Cedar Park, TX (US)

(73) Assignee: MediaTek Inc., Hsin-Chu (TW)

( * ) Notice: Subject to any disclaimer, the term of this patent is extended or adjusted under 35 U.S.C. 154(b) by 973 days.

(21) Appl. No.: 12/106,251

(22) Filed: Apr. 18, 2008

(65) Prior Publication Data

US 2008/0288741 A1  Nov. 20, 2008

Related U.S. Application Data

(60) Provisional application No. 60/923,974, filed on Apr. 18, 2007.

(51) Int. Cl.
*G06F 12/00* (2006.01)
*G06F 13/00* (2006.01)
*G06F 13/28* (2006.01)

(52) U.S. Cl. ...................................... 711/220
(58) Field of Classification Search .................... 711/220
See application file for complete search history.

(56) References Cited

U.S. PATENT DOCUMENTS

| | | | |
|---|---|---|---|
| 6,182,022 B1 | 1/2001 | Mayle et al. | |
| 6,347,383 B1 | 2/2002 | Elnozahy | |
| 6,918,065 B1 | 7/2005 | Edwards et al. | |
| 2008/0016330 A1* | 1/2008 | El-Essawy et al. | 712/225 |

FOREIGN PATENT DOCUMENTS

| EP | 1349074 A | 10/2003 |
|---|---|---|
| WO | 99/57640 A | 11/1999 |

OTHER PUBLICATIONS

Milenkovic et al., Exploiting Streams in Instruction and Data Address Trace Compression, 2003, IEEE International Workshop on Workload Characterization, pp. 99-107.*
International Search Report dated Mar. 9, 2009 in corresponding European Patent Application No. 08155214.3.
Johnson E E et al. "PDATS. Lossless Address Trace Compression for Reducing File size and Access Time" Proceedings of the Annual International Phoenix Conference on Computers and Communications. Phoenix, pp. 213-219 Apr. 12-15, 1994.
Samples A. D. "Mache: No-Loss Trace Compaction" ACM Sigmetrics Performance Evaluation Review vol. 17, No. 1, pp. 89-97, Section 3, 1989.
Johnson E E et al. "Lossless Trace Compression" IEEE Transactions on Computers, vol. 50, No. 2 Feb. 1, 2001.
John L K et al. "Locality-Based Online Trace Compression" IEEE Transactions on Computers, vol. 53, No. 6, Jun. 1, 2004.
Ketterlin A et al. "Prediction and trace compression of data access addresses through nested loop recognition" Proceedings of the 2008 CGO—Sixth International Symposium on Code Generation and Optimization Association for Computing Machinery, US, Apr. 10, 2008, pp. 94-103.

* cited by examiner

*Primary Examiner* — Kevin Ellis
*Assistant Examiner* — Chad Davidson
(74) *Attorney, Agent, or Firm* — Fish & Richardson P.C.

(57) ABSTRACT

A moving window history of at least one previous data address accessed by a processor is maintained, the at least one previous data address in the history each being associated with an index. A difference between a current data address and one of the at least one previous data address in the history is determined. The difference and the index associated with the one of the at least one previous data address in the history are provided as a representation of the current address.

48 Claims, 10 Drawing Sheets

210

=== SENDING DAG: cb3e5676 R ===
=== SENDING DAG: cb3e5676 R ===
=== SENDING DAG: cb3e5676 R ===
=== SENDING DAG: cb3e5676 R ===
=== SENDING DAG: cb3e5676 R === } 212
=== SENDING DAG: cb3e5676 R ===
=== SENDING DAG: cb3e5676 R ===
=== SENDING DAG: cb3e5676 R ===
=== SENDING DAG: cb3e5676 R ===
=== SENDING DAG: 9abd61a6 R ===
=== SENDING DAG: 9abd61a6 R ===
=== SENDING DAG: 9abd61a6 R ===
=== SENDING DAG: 9abd61a6 R ===
=== SENDING DAG: 9abd61a6 R ===
=== SENDING DAG: 9abd61a6 R ===
=== SENDING DAG: 9abd61a6 R ===
=== SENDING DAG: 9abd61a6 R ===
=== SENDING DAG: faa6a8e5 R ===
=== SENDING DAG: faa6a8e5 R ===
=== SENDING DAG: faa6a8e5 R ===
=== SENDING DAG: faa6a8e5 R ===
=== SENDING DAG: faa6a8e5 R ===
=== SENDING DAG: faa6a8e5 R ===
=== SENDING DAG: faa6a8e5 R ===
=== SENDING DAG: faa6a8e5 R ===
=== SENDING DAG: faa6a8e5 R ===
=== SENDING DAG: 25ab24b6 R ===
=== SENDING DAG: 25ab24b6 R ===
=== SENDING DAG: 25ab24b6 R ===
=== SENDING DAG: 25ab24b6 R ===
=== SENDING DAG: 25ab24b6 R ===
=== SENDING DAG: 25ab24b6 R ===
=== SENDING DAG: 25ab24b6 R ===
=== SENDING DAG: 8b62be44 R ===
=== SENDING DAG: 8b62be44 R ===
=== SENDING DAG: 8b62be44 R ===
=== SENDING DAG: 8b62be44 R ===
=== SENDING DAG: 8b62be44 R ===
=== SENDING DAG: 8b62be44 R ===
=== SENDING DAG: 8b62be44 R ===
=== SENDING DAG: 9e0a0029 R ===

0 cb3e5676 r 0 -885107082
0 cb3e5676 r 0 0
0 cb3e5676 r 0 0
0 cb3e5676 r 0 0
0 cb3e5676 r 0 0
0 cb3e5676 r 0 0 } 222
0 cb3e5676 r 0 0
0 cb3e5676 r 0 0
0 cb3e5676 r 0 0
0 9abd61a6 r 0 -813757648
0 9abd61a6 r 0 0
0 9abd61a6 r 0 0
0 9abd61a6 r 0 0
0 9abd61a6 r 0 0
0 9abd61a6 r 0 0
0 9abd61a6 r 0 0
0 9abd61a6 r 0 0
0 faa6a8e5 r 0 1609123647
0 faa6a8e5 r 0 0
0 faa6a8e5 r 0 0
0 faa6a8e5 r 0 0
0 faa6a8e5 r 0 0
0 faa6a8e5 r 0 0
0 faa6a8e5 r 0 0
0 faa6a8e5 r 0 0
0 faa6a8e5 r 0 0
0 25ab24b6 r 0 721714129
0 25ab24b6 r 0 0
0 25ab24b6 r 0 0
0 25ab24b6 r 0 0
0 25ab24b6 r 0 0
0 25ab24b6 r 0 0
0 25ab24b6 r 0 0
0 8b62be44 r 0 1706531214
0 8b62be44 r 0 0
0 8b62be44 r 0 0
0 8b62be44 r 0 0
0 8b62be44 r 0 0
0 8b62be44 r 0 0
0 8b62be44 r 0 0
0 9e0a0029 r 0 312951269

FIG. 7B

```
        i K         D Address      G H                                              230
        0 0         0 0x00000000   0 0                                         ↓    ↗
        1 0         0 0x00000000   0 0        i K         D Address      G H
        2 0         0 0x00000000   0 0        0 0         0 0xcb3e5676   0 0
        3 0         0 0x00000000   0 0        1 0         0 0xcb3e5676   0 0
        4 0         0 0x00000000   0 0        2 0         0 0xcb3e5676   0 0
      ↗ 5 0         0 0x00000000   0 0        3 0 -885107082 0xcb3e5676   0 0
        6 0         0 0x00000000   0 0        4 0         0 0x00000000   1 1
  232   7 0         0 0x00000000   0 0        5 0         0 0x00000000   1 1
        8 0         0 0x00000000   0 0        6 0         0 0x00000000   1 1
        L = 0                                 7 0         0 0x00000000   1 1
        5Byte time=0 Address=cb3e5676 r       8 0         0 0x00000000   1 1
                                              L = 3
        i K         D Address      G H
        0 0 -885107082 0xcb3e5676  0 0        i K         D Address      G H
        1 0         0 0x00000000   0 0        0 0         0 0xcb3e5676   0 0
        2 0         0 0x00000000   0 0        1 0         0 0xcb3e5676   0 0
        3 0         0 0x00000000   0 0        2 0         0 0xcb3e5676   0 0
        4 0         0 0x00000000   0 0        3 0         0 0xcb3e5676   0 0
      ↗ 5 0         0 0x00000000   0 0        4 0 -885107082 0xcb3e5676   0 0
        6 0         0 0x00000000   0 0        5 0         0 0x00000000   1 1
  234   7 0         0 0x00000000   0 0        6 0         0 0x00000000   1 1
        8 0         0 0x00000000   0 0        7 0         0 0x00000000   1 1
        L = 0                                 8 0         0 0x00000000   1 1
                                              L = 4
        i K         D Address      G H
        0 0         0 0xcb3e5676   0 0        i K         D Address      G H
        1 0 -885107082 0xcb3e5676  0 0        0 0         0 0xcb3e5676   0 0
        2 0         0 0x00000000   1 1        1 0         0 0xcb3e5676   0 0
        3 0         0 0x00000000   1 1        2 0         0 0xcb3e5676   0 0
        4 0         0 0x00000000   1 1        3 0         0 0xcb3e5676   0 0
        5 0         0 0x00000000   1 1        4 0         0 0xcb3e5676   0 0
        6 0         0 0x00000000   1 1        5 0 -885107082 0xcb3e5676   0 0
        7 0         0 0x00000000   1 1        6 0         0 0x00000000   1 1
        8 0         0 0x00000000   1 1        7 0         0 0x00000000   1 1
        L = 1                                 8 0         0 0x00000000   1 1
                                              L = 5
        i K         D Address      G H
        0 0         0 0xcb3e5676   0 0        i K         D Address      G H
        1 0         0 0xcb3e5676   0 0        0 0         0 0xcb3e5676   0 0
        2 0 -885107082 0xcb3e5676  0 0        1 0         0 0xcb3e5676   0 0
        3 0         0 0x00000000   1 1        2 0         0 0xcb3e5676   0 0
        4 0         0 0x00000000   1 1        3 0         0 0xcb3e5676   0 0
        5 0         0 0x00000000   1 1        4 0         0 0xcb3e5676   0 0
        6 0         0 0x00000000   1 1        5 0         0 0xcb3e5676   0 0
        7 0         0 0x00000000   1 1        6 0 -885107082 0xcb3e5676   0 0
        8 0         0 0x00000000   1 1        7 0         0 0x00000000   1 1
        L = 2                                 8 0         0 0x00000000   1 1
                                              L = 6
```

```
i K         D Address      G H
0 0         0 0xcb3e5676   0 0
1 0         0 0xcb3e5676   0 0
2 0         0 0xcb3e5676   0 0
3 0         0 0xcb3e5676   0 0
4 0         0 0xcb3e5676   0 0
5 0         0 0xcb3e5676   0 0
6 0         0 0xcb3e5676   0 0
7 0 -885107082 0xcb3e5676  0 0
8 0         0 0x00000000   1 1
L = 7
1Byte time=0 position=8 length=7
1Byte time=0 index=0 difference=0 i K         D Address      G H
0 0         0 0xcb3e5676   0 0
1 0         0 0xcb3e5676   0 0
2 0         0 0xcb3e5676   0 0
3 0         0 0xcb3e5676   0 0
4 0         0 0xcb3e5676   0 0
5 0         0 0xcb3e5676   0 0
6 0         0 0xcb3e5676   0 0
7 0         0 0xcb3e5676   0 0
8 0 -885107082 0xcb3e5676  1 0
L = 0
5Byte time=0 Address=9abd61a6 r i K         D Address      G H
0 0 -813757648 0x9abd61a6  0 0
1 0         0 0xcb3e5676   0 0
2 0         0 0xcb3e5676   0 0
3 0         0 0xcb3e5676   0 0
4 0         0 0xcb3e5676   0 0
5 0         0 0xcb3e5676   0 0
6 0         0 0xcb3e5676   0 0
7 0         0 0xcb3e5676   0 0
8 0         0 0xcb3e5676   1 0
L = 0 i K         D Address      G H
0 0         0 0x9abd61a6   0 0
1 0 -813757648 0x9abd61a6  0 0
2 0         0 0xcb3e5676   1 1
3 0         0 0xcb3e5676   1 1
4 0         0 0xcb3e5676   1 1
5 0         0 0xcb3e5676   1 1
6 0         0 0xcb3e5676   1 1
7 0         0 0xcb3e5676   1 1
8 0         0 0xcb3e5676   1 1
L = 1
```

```
i K         D Address      G H
0 0         0 0x9abd61a6   0 0
1 0         0 0x9abd61a6   0 0
2 0 -813757648 0x9abd61a6  0 0
3 0         0 0xcb3e5676   1 1
4 0         0 0xcb3e5676   1 1
5 0         0 0xcb3e5676   1 1
6 0         0 0xcb3e5676   1 1
7 0         0 0xcb3e5676   1 1
8 0         0 0xcb3e5676   1 1
L = 2 i K         D Address      G H
0 0         0 0x9abd61a6   0 0
1 0         0 0x9abd61a6   0 0
2 0         0 0x9abd61a6   0 0
3 0 -813757648 0x9abd61a6  0 0
4 0         0 0xcb3e5676   1 1
5 0         0 0xcb3e5676   1 1
6 0         0 0xcb3e5676   1 1
7 0         0 0xcb3e5676   1 1
8 0         0 0xcb3e5676   1 1
L = 3 i K         D Address      G H
0 0         0 0x9abd61a6   0 0
1 0         0 0x9abd61a6   0 0
2 0         0 0x9abd61a6   0 0
3 0         0 0x9abd61a6   0 0
4 0 -813757648 0x9abd61a6  0 0
5 0         0 0xcb3e5676   1 1
6 0         0 0xcb3e5676   1 1
7 0         0 0xcb3e5676   1 1
8 0         0 0xcb3e5676   1 1
L = 4 i K         D Address      G H
0 0         0 0x9abd61a6   0 0
1 0         0 0x9abd61a6   0 0
2 0         0 0x9abd61a6   0 0
3 0         0 0x9abd61a6   0 0
4 0         0 0x9abd61a6   0 0
5 0 -813757648 0x9abd61a6  0 0
6 0         0 0xcb3e5676   1 1
7 0         0 0xcb3e5676   1 1
8 0         0 0xcb3e5676   1 1
L = 5 o
              o
              o
```

```
=== RECEIVING (DUT): f6 ===
=== RECEIVING (DUT): d9 ===
=== RECEIVING (DUT): f2 ===
=== RECEIVING (DUT): b3 ===
=== RECEIVING (DUT): 19 ===
=== RECEIVING (DUT): b7 ===
=== RECEIVING (DUT): 00 ===
=== RECEIVING (DUT): e6 ===
=== RECEIVING (DUT): 86 ===
=== RECEIVING (DUT): eb ===
=== RECEIVING (DUT): ab ===
=== RECEIVING (DUT): 13 ===
=== RECEIVING (DUT): b7 ===
=== RECEIVING (DUT): 00 ===
=== RECEIVING (DUT): e5 ===
=== RECEIVING (DUT): a3 ===
=== RECEIVING (DUT): b5 ===
=== RECEIVING (DUT): aa ===
=== RECEIVING (DUT): 1f ===
=== RECEIVING (DUT): b7 ===
=== RECEIVING (DUT): 00 ===
=== RECEIVING (DUT): 87 ===
=== RECEIVING (DUT): f6 ===
=== RECEIVING (DUT): 92 ===
=== RECEIVING (DUT): d9 ===
=== RECEIVING (DUT): da ===
=== RECEIVING (DUT): 04 ===
=== RECEIVING (DUT): af ===
=== RECEIVING (DUT): c4 ===
=== RECEIVING (DUT): f9 ===
=== RECEIVING (DUT): 95 ===
=== RECEIVING (DUT): b6 ===
=== RECEIVING (DUT): 11 ===
=== RECEIVING (DUT): ae ===
=== RECEIVING (DUT): e9 ===
=== RECEIVING (DUT): 80 ===
=== RECEIVING (DUT): d0 ===
=== RECEIVING (DUT): e0 ===
=== RECEIVING (DUT): 13 ===
```

FIG. 7E

```
|PACKET| Multi-byte(5) individual access: 19b3f2d9f6
|PACKET| Interval access: {L,P} = {7,7}
|PACKET| Single byte individual access: 00
|PACKET| Multi-byte(5) individual access: 13abeb86e6
|PACKET| Interval access: {L,P} = {7,7}
|PACKET| Single byte individual access: 00
|PACKET| Multi-byte(5) individual access: 1faab5a3e5
|PACKET| Interval access: {L,P} = {7,7}
|PACKET| Single byte individual access: 00
|PACKET| Interval access: {L,P} = {1,7}
|PACKET| Multi-byte(5) individual access: 04dad992f6
|PACKET| Interval access: {L,P} = {6,7}
|PACKET| Multi-byte(5) individual access: 11b695f9c4
|PACKET| Interval access: {L,P} = {6,6}
|PACKET| Multi-byte(5) individual access: 13e0d080e9
```

DATA ACCESS TRACING WITH COMPRESSED ADDRESS OUTPUT

RELATED APPLICATIONS

This application claims priority to U.S. patent application Ser. No. 60/923,974 filed on Apr. 18, 2007, the contents of which are incorporated herein by reference.

BACKGROUND

This description is related to data access tracing.

Embedded processors may include a digital signal processor and a memory on a single chip. The memory may incorporate a cache memory to take advantage of temporal and spatial locality of data access patterns. In some examples, use of the cache memory may result in overhead due to cache fills and copybacks. When the processor encounters a cache miss, the cache hardware may fill a cache line from a lower level in the memory hierarchy. In a cache fill, the memory operation that produced the cache miss may stall the processor and wait for the data to be read from memory.

SUMMARY

In general, in one aspect, data addresses are traced. A moving window history of one or more previous data addresses accessed by a processor is maintained, in which each of the previous data addresses in the moving window history is associated with an index. A difference between a current data address and one of the previous data addresses in the moving window history is determined. The difference and the index associated with the previous data address in the moving window history are provided as a representation of the current address.

Implementations may include one or more of the following features. Determining a difference can include determining a minimum absolute difference between the current data address and two or more previous data addresses in the moving window history. Maintaining a moving window history can include maintaining a read history of one or more previous read data addresses accessed by the processor. Determining the minimum absolute difference can include determining a minimum absolute difference between a current read data address and the previous read data addresses in the moving window history. Maintaining a moving window history can include maintaining a write history of one or more previous write data addresses accessed by the processor. Determining the minimum absolute difference can include determining a minimum absolute difference between a current write data address and the previous write data addresses in the moving window history. Maintaining a moving window history can include storing the previous data addresses in a first-in, first-out buffer. Determining the minimum absolute difference can include calculating an absolute difference between the current data address and each of the two or more previous data addresses in the history, and selecting the minimum absolute difference from the calculated absolute differences. The moving window history can be updated. Updating the moving window history can include adding the current data address to the history and removing an oldest previous data address from the history.

In general, in another aspect, memory addresses that are accessed by a processor are received; the addresses are compressed to generate compressed addresses; and the compressed addresses are outputted.

Implementations may include one or more of the following features. Compressing the addresses can include determining a difference between a current address and a previous address, and outputting the difference as a representation of the current address. Compressing the addresses can include maintaining a history of at least one previous address accessed by the processor, determining a minimum difference between a current address and at least one previous address, identifying an index associated with the previous address, and outputting the difference and the index as a representation of the current address. Compressing the addresses can include identifying a second sequence of accesses that is a repeat of a first sequence of accesses, determining a length of the second sequence of accesses, and determining a starting point of the second sequence of accesses relative to the first sequence of accesses. Compressing the addresses can include maintaining a history of at least one previous address accessed by the processor, determining a minimum difference D between a current address A and the at least one previous address, and determining an index K associated with the previous address. Compressing the addresses can include reducing the values of an address A, a difference D, and an index K into byte-sized packets, outputting the difference D and index K as a representation of the address A if the number of bits needed to represent D is less than a threshold, and outputting the address A if the number of bits needed to represent the difference D is above the threshold. Compressing the addresses can include examining addresses represented as a sequence of packets {K, D} and identifying a second sequence of accesses that is a repeat of a first sequence of accesses, identifying a length L of the second sequence of accesses, and identifying a starting point P of the second sequence of accesses relative to the first sequence of accesses.

In general, in another aspect, a buffer memory maintains a moving window history of at least one previous data address accessed by a processor, each of at least one previous data address in the moving window history being associated with an index. A compression circuit determines a difference between a current data address and at least one previous data address in the moving window history, and provides, as a representation of the current data address, the difference and the index associated with at least one previous data address in the moving window history.

Implementations may include one or more of the following features. The compression circuit can be configured to determine a minimum absolute difference between the current data address and two or more previous data addresses in the moving window history, and to provide, as the representation of the current data address, the minimum absolute difference and its sign, and a corresponding index. The memory device can include a read history buffer to maintain a read history of one or more previous read data addresses. The compression circuit can be configured to determine a minimum absolute difference between a current read data address and the previous read data addresses in the read history buffer. The memory device can include a write history buffer to maintain a write history of one or more previous write data addresses. The compression circuit can be configured to determine a minimum absolute difference between a current write data address and the previous write data addresses in the write history buffer. The memory unit can include a first-in, first-out buffer. The compression circuit can be configured to calculate an absolute difference between the current data address and each of the two or more previous data addresses in the history and to select the minimum absolute difference from the calculated absolute differences. The compression circuit can be configured to update the moving window history, for example, by adding the current data address to the history and removing an oldest previous data address from the history.

In general, in another aspect, a memory device has addresses; a processor accesses the addresses in the memory device; and a data trace module compresses the addresses accessed by the processor to generate compressed addresses and output the compressed addresses.

Implementations may include one or more of the following features. The data trace module can include a history based compression unit that determines a difference between a current address and a previous address, and outputs the difference as a representation of the current address. The data trace module can include a history based compression unit that determines a minimum difference between a current address and at least one previous address, identifies an index associated with the previous address, and outputs the difference and the index as a representation of the current address. The data trace module can include an interval based compression unit that identifies a second sequence of accesses that is a repeat of a first sequence of accesses, and outputs a first value and a second value to represent the second sequence of accesses, the first value representing a length of the second sequence of accesses and the second value representing a starting point of the second sequence of accesses.

In general, in another aspect, an integrated circuit includes a processor, and a data trace module to trace data addresses accessed by the processor and generate an output representing the data addresses.

Implementations may include one or more of the following features. The integrated circuit can include a memory, and the data trace module traces data addresses of the memory accessed by the processor. The data trace module can trace data addresses of an external storage accessed by the processor, the external storage being external to the integrated circuit. The external storage can include dynamic random access memory, static random access memory, and/or flash memory. The data trace module can compress the data addresses, and the output of the data trace module can include compressed data addresses.

The data trace module can compress some of the data addresses using a history-based compression by comparing a difference between a current data address and a previous data address, and using the difference to represent the current data address. The data trace module can compress some of the data addresses using an interval-based compression by matching a current sequence of data addresses with a previous sequence of data addresses, and using a length of the current sequence of data addresses and an offset between the current and previous sequences of addresses to represent the current sequence of addresses. The data trace module can compress some of the data addresses into byte-size packets. The data trace module can be selectable between a first state in which the data addresses are compressed using a history-based compression and an interval-based compression, and a second state in which the data addresses are compressed using the history-based compression but not the interval-based compression.

The data trace module can provide a complete trace of all data addresses accessed by the processor. The data trace module can include a buffer to temporarily store the data addresses accessed by the processor. In some examples, the data trace module can perform lossy compression of the data addresses when the buffer overflows. The data trace module can generate a synchronization signal when the buffer overflows. In some examples, the data trace module can stall the processor when there are more data addresses than can be processed by the data trace module. The data trace module can generate a synchronization signal indicating a beginning of a segment of data addresses. In some examples, the data trace module can generate the synchronization signal based on a counter value and a determination that a pause occurred in the data addresses input to the data trace module. The processor and the data trace module can be located in a same core in the integrated circuit, in which the processor operates at a first frequency. The integrated circuit can include a second core having a second processor operating at a second frequency and a second data trace module to trace data addresses accessed by the second processor.

These and other aspects and features, and combinations of them, may be expressed as methods, apparatus, systems, means for performing functions, program products, and in other ways.

Advantages of the aspects and features include one or more of the following. Addresses accessed by a processor can be logged and analyzed. Based on the address trace information, software applications can be optimized for particular hardware configurations. Similarly, hardware applications can be optimized for particular software applications. The information about accesses to memory addresses can be used to optimize, e.g., the cache memory size, cache line size, replacement policy, granularity in marking portions of the dirty cache line, and allocation of L1 and L2 caches.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 7A shows an example listing of an input trace of addresses.

FIG. 7B shows an example listing of addresses in a buffer of the history-based compression block.

FIGS. 7C and 7D show an example listing of addresses in a buffer of the interval-based compression block.

FIG. 7E shows an example listing of byte-sized packets.

FIG. 7F shows an example listing of reconstructed packets.

Like reference symbols in the various drawings indicate like elements.

DETAILED DESCRIPTION

Figure 1:
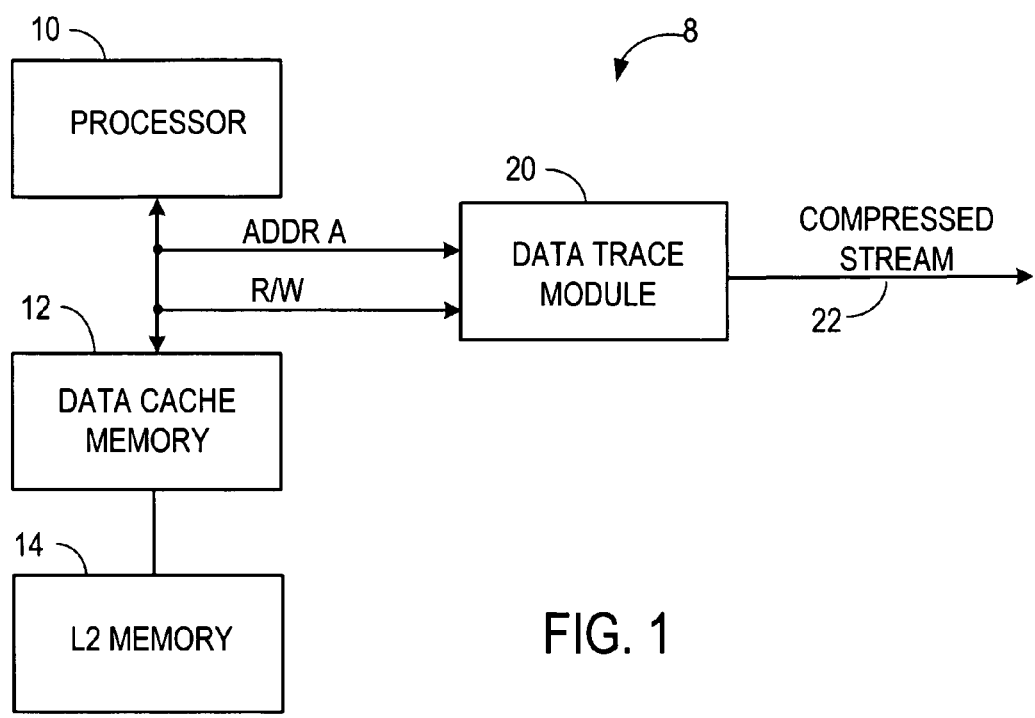
FIG. 1 is a block diagram of an example processing system incorporating a data trace module.

Referring to FIG. 1, an example processing system 8 includes a data trace module 20 to monitor data addresses accessed by a processor 10. The output of the data trace module can be a compressed stream that, when decompressed, includes information about the address and a read/write indicator for each access. Information about the data addresses being accessed can be analyzed to improve a performance of the system 8 (e.g., to reduce cache misses).

The processor 10 accesses a data cache memory 12 to obtain data for executing instructions. The processor 10 may be a digital signal processor, a microcontroller or a general purpose microprocessor. The data cache memory 12 is a relatively small capacity, high-speed memory. When data required by the processor 10 is present in the data cache memory 12 (a cache hit), a high-speed operation can be achieved. When the data required by the processor 10 is not present in the cache memory 12 (a cache miss), a cache fill operation is performed to access the required data in a level 2 (L2) memory 14. In a cache fill operation, a line of cache memory is copied back to the L2 memory 14 in order to make room for the new data in the cache memory 12. Because frequent cache misses may cause delay and reduce performance, analyzing the memory access pattern of the processor 10 may provide information can be used to adjust system parameters, such as the sizes of the cache memory 12 and the L2 memory 14, to reduce cache misses and thereby improving system performance.

For example, the information about accesses to memory addresses can be useful in determining the impact of a bigger cache memory, the impact of a more associative cache memory, the impact of a different cache line size, the impact of a different replacement policy, the impact of greater granularity in marking portions of the cache line dirty, and the impact of moving data structures from L1 memory to external cache memory.

In the example of FIG. 1, the data trace module 20 is used to monitor data addresses accessed by the processor 10 in the data cache memory 12. The data trace module 20 receives each address A supplied by the processor 10 to the data cache memory 12 and a read/write (R/W) signal that indicates whether the data access is a read operation or a write operation. The data trace module 20 supplies a compressed stream of data addresses 22 for off-chip analysis of hardware and software performance. The compressed stream of data addresses 22 can provide information about the addresses associated with accesses. In some examples, the compressed stream also includes information about the type of the accesses (e.g., read access, write access, or cache control). Different software applications executing on a same hardware configuration may have different performances. By analyzing the data addresses accessed by the processor 10 while executing software applications, the software applications can be optimized with respect to particular hardware configurations. Similarly, hardware configurations can be optimized for particular software applications.

In some implementations, the data trace module 20 can provide the user options to reduce the bandwidth of output compressed stream of data addresses 22. This can be useful in situations where the processor 10 executes an application that results in a large number of data accesses that overwhelms the trace module. For example, the data trace module 20 can allow the user to set the following options:
(1) Tracing within an address range defined in a MIN and MAX address.
(2) Tracing outside an address range defined in a MIN and MAX address.
(3) Tracing specific categories of accesses, such as accesses that hit an internal L1 cache or an internal L1 static random access memory (SRAM),
   (i) within an address range defined in a MIN and MAX address,
   (ii) outside an address range defined in a MIN and MAX address.
(4) Tracing only off-core bus activity,
   (i) within an address range defined in a MIN and MAX address,
   (ii) outside an address range defined in a MIN and MAX address.
(5) Filtering cache control instructions for user specific cache management.
(6) Filtering based on a wide range of performance monitoring events (e.g., cache misses in specific regions, or nth occurrence of a cache miss).

The data trace module 20 can be used in any product that analyzes the behavior of a chip. In some implementations, the data trace module 20 and the processor 10 can both reside in the same chip or integrated circuit. The data trace module 20 can be placed inside the processor core or outside the core. The processor 10 and the data cache memory 12 can reside in the same chip. The data cache memory 12 can be inside the processor core boundary or outside the core. The data trace module 20 generates a compressed address stream that is sent outside of the chip, where the address stream is reconstructed outside of the chip for further analysis and debugging.

It is useful to place the data trace module 20 and the processor 10 in the same chip when the processor 10 operates at a high frequency (e.g., several hundred megahertz or even gigahertz). In some examples, the data rate for the address information may be higher than the data rate that can be accommodated by the pads that communicate on-chip data to external circuitry. Placing the data trace module 20 in the same chip as the processor 10 can prevent a loss of data, thereby providing a complete trace of the data addresses accessed by the processor. This can also prevent tying up the use of expensive pads for a debug and development application. When the data trace module 20 is placed in the same core or chip as the processor 10, the addresses that can be traced by the data trace module 20 are not limited to addresses belonging to on-core or on-chip memory units. The data trace module 20 can also trace addresses going to off-core or off-chip memory units.

The data trace module 20 is useful in tracing a large number of accesses to data addresses when running particular applications. For example, an MPEG video decoder application may cause the processor 10 to access data very 2 clock cycles. If the processor 10 is operating at 260 MHz, the stream of data addresses will have a bandwidth of 520 megabytes per second. The data trace module can trace multiple streams of addresses at high frequencies of operation. The addresses are not limited to those of cache memory chips. The addresses can also be those of dynamic random access memory devices, static random access memory devices, flash memory devices, hard drives, or optical disc drives, etc.

Figure 2:
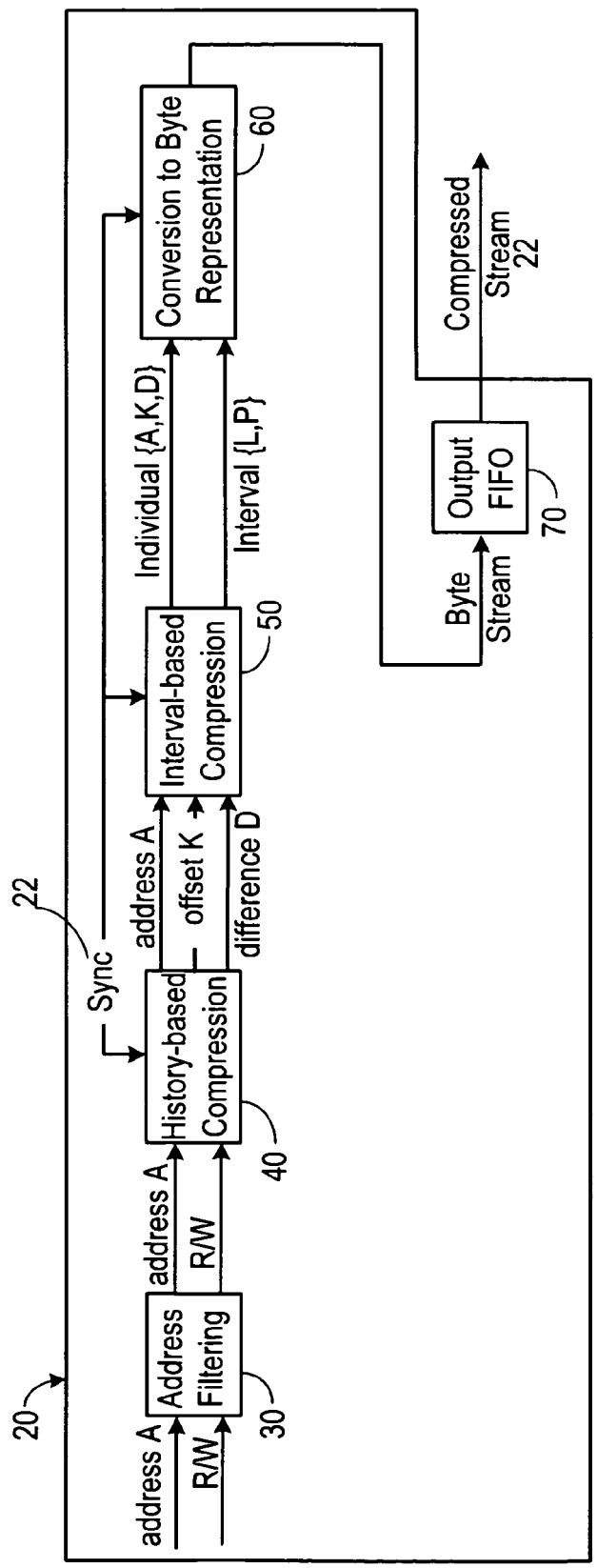
FIG. 2 is a schematic block diagram of an example data trace module.

Referring to FIG. 2, in some implementations, the data trace module 20 includes an address filtering block 30, a history-based compression block 40, an interval-based compression block 50, a conversion-to-byte representation block 60 and an output FIFO 70.

The address filtering block 30 may be controlled by a configuration register and may include or exclude certain types of accesses and may shift (e.g., right shift) the data addresses by a programmable value, such as from zero to seven. The address filtering block 30 can be used to reduce the number of addresses that is being traced based on the user configurable options described above.

The history-based compression block 40 keeps a history of the addresses of past accesses, and compresses the address information by finding the difference between the current access address and the addresses of N previous accesses. The current address is encoded as a difference of D bytes from the K-th previous access. The parameters K and D are referred to as the offset and the difference, respectively. Because accesses to memory tend to show some locality, D often takes only a few bits to represent.

The history-based compression block 40 receives current data addresses A and the corresponding read/write signals from the address filtering block 30, and outputs addresses A, offsets K, and differences D signals to the interval-based compression block. In the examples below, each data address is 32 bits. However, the data address can also be represented using other number of bits. The history-based compression block 40 will be described in more detail later in this document.

The interval-based compression block 50 finds redundancies between groups of consecutive data accesses. The intuition is that some execution sequences cause patterns of consecutive accesses. For example, the {K, D} sequence may be 1. {3, 1}
2. {3, 0}
3. {4, 2}
4. {2, 1}
5. {1, 6}
6. {3, 1})
7. {3, 0}
8. {4, 2}
9. {2, 1}

In this case, the interval-based compression process would represent accesses 6 to 9 as a repeat of accesses 1 to 4. The accesses 6 to 9 can be encoded in a message of the form "An interval of length 4, starting from 5 accesses ago." Each interval can be defined by L, the length of the interval, and P, the starting point of the interval as a relative reference from the first access of the interval. In the example above, L=4 and P=5.

In one implementation, the interval-based compression can be performed by maintaining a history of the past 8 accesses in {K, D} form, and encoding intervals of up to 8 accesses using in one packet {L, P}. In this example, L and P are both allowed a maximum value of 8. The output of the interval-based compression block 50 can be one of two types of packets: (1) an individual access packet [A, D, K] or (2) an interval packet [L, P].

Figure 3:
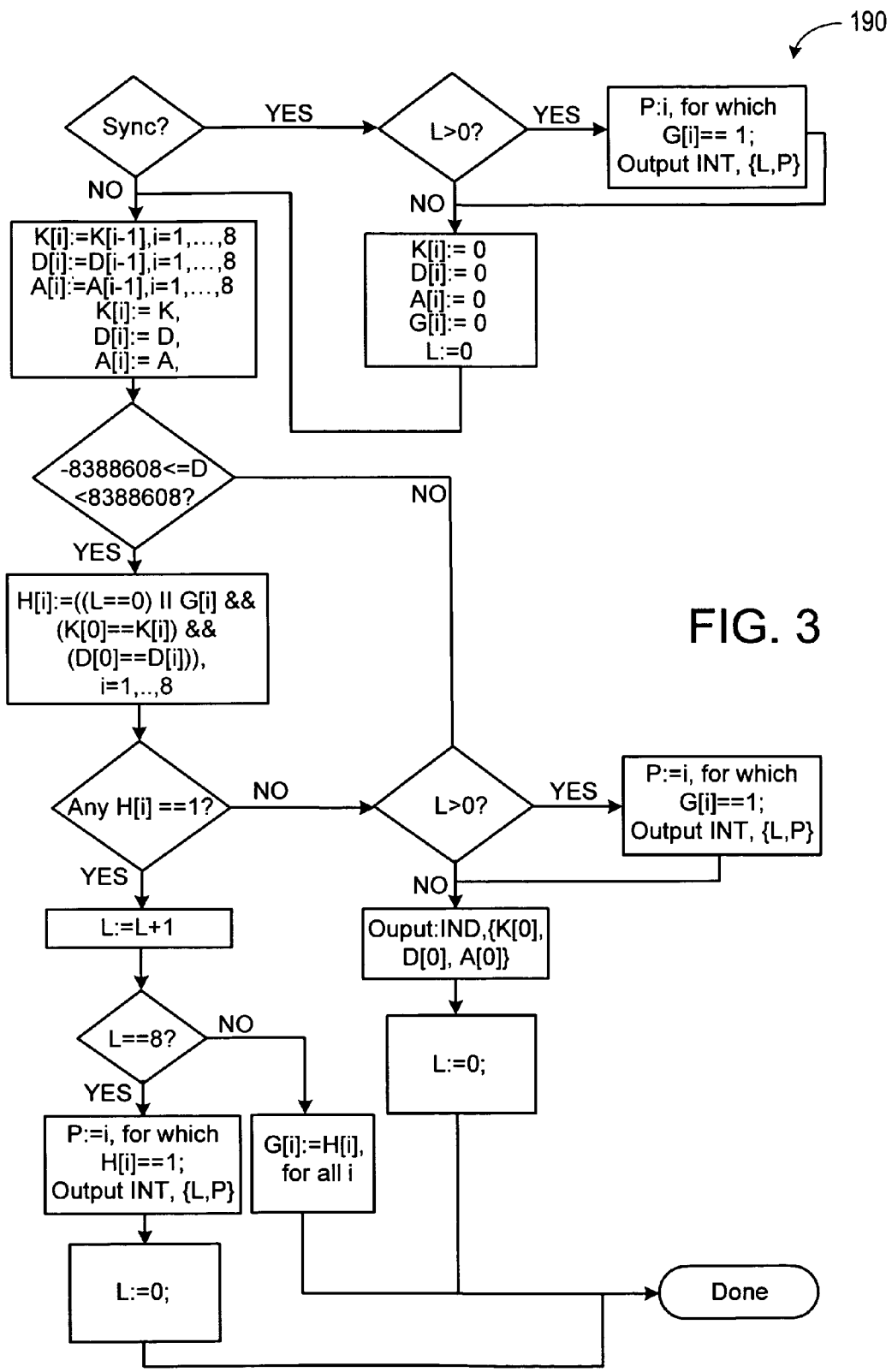
FIG. 3 shows a flow diagram of an example process for performing interval-based compression.

FIG. 3 shows a flow diagram of an example process 190 for performing interval-based compression. For example, the process 190 can be implemented by the interval-based compression block 50. The interval-based compression tries to find a sequence of addresses that matches an earlier sequence of addresses, and outputs a length of the sequence and a position of the sequence relative to the previous sequence. For each new address that comes in, the process 190 determines whether it is adding to the matching sequence, and if not, the matched sequence is sent out, and the new address starts a new sequence. The process 190 adds a new address to a sequence until one of the following three conditions is met: (i) a synchronization signal is received, (ii) the new address does not add to the matching, or (iii) when the interval buffer space runs out.

The data trace module 20 may provide the option to drop the least significant bits from the captured address. The number of bits to drop can be programmable, e.g., from 0 to 7 bits. There may be an option to filter out the uncached L1 SRAM accesses.

The conversion-to-byte representation block 60 converts the packets output from the interval-based compression block 50 into byte-sized packets. This process is designed with two goals: efficiency and synchronization. The block 60 achieves a high compression ratio, using as few bytes as necessary to represent the information. The block 60 also provides a way for an observer of the output stream to "synchronize" to the state of the encoding process, including being able to reconstruct the state of the buffers.

In some examples, the memory space is 4 gigabytes, and the address stream that is being compressed includes a stream of 32-bit addresses. Each packet {A, D, K} or {L, P} can take between 1 and 5 bytes to represent. If the difference D requires more than a threshold, e.g., 24 bits, the data address A, rather than the difference D and the index K, is output. The threshold can increase if the address is represented in a higher number of bits (e.g., 64 bits). In this example, the address encoding itself consumes some of the data bits in the 40-bit output, and a difference D that is more than the threshold cannot be efficiently encoded, so in such cases the full address A is sent. Otherwise, the difference D and the index K are output. The output FIFO 70 provides the compressed address information to an off-chip analysis unit.

Figure 4:
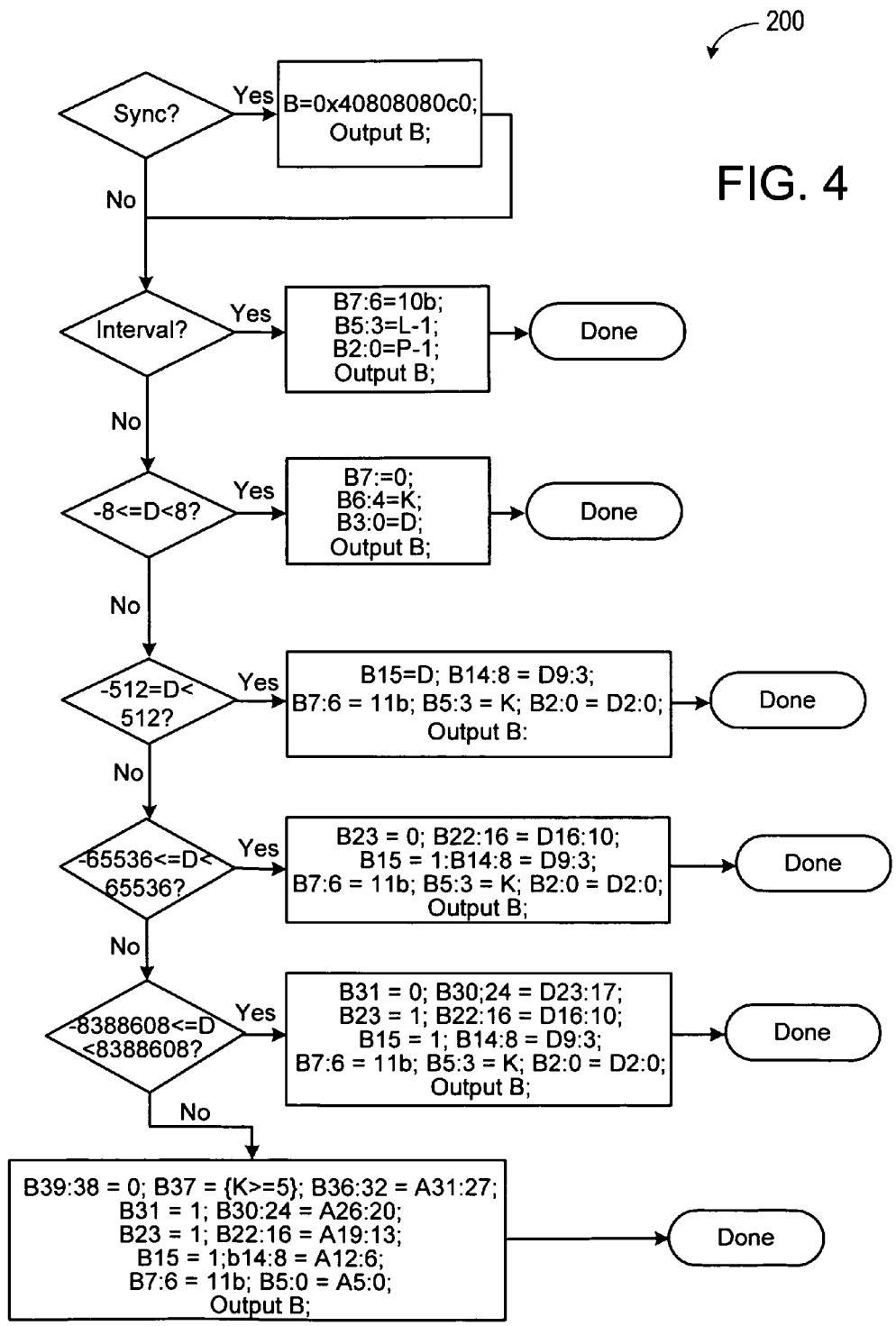
FIG. 4 shows a flow diagram of an example process for reducing information into byte-sized packets.

FIG. 4 shows a flow diagram of an example process 200 for reducing information into byte-sized packets. For example, the process 200 can be implemented by using the conversion-to-byte representation block 60.

Figure 5:
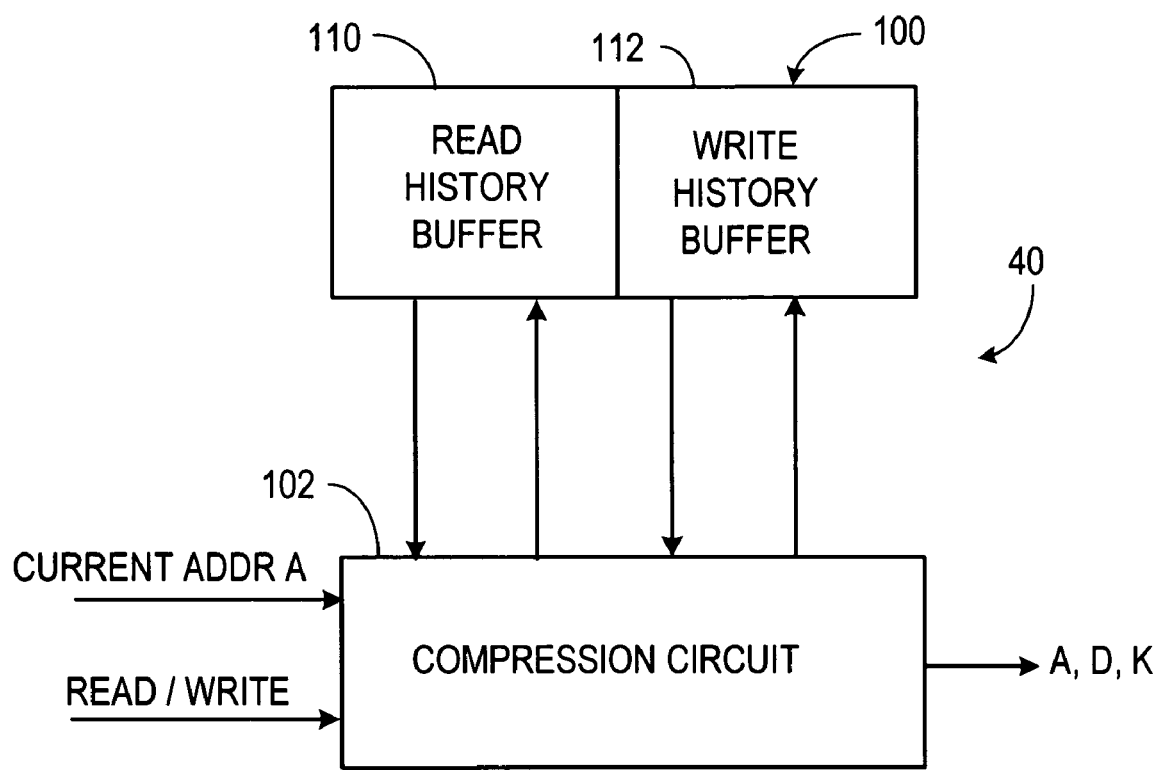
FIG. 5 is a block diagram of an example history-based compression block.

Referring to FIG. 5, in some implementations, the history-based compression block 40 includes a buffer memory unit 100 connected to a compression circuit 102. The memory unit 100 includes a moving window history of data addresses recently accessed by the processor 10. The memory unit 100 includes a read history buffer 110 and a write history buffer 112. The read history buffer 110 includes a moving window history of one or more data addresses accessed by the processor 10 during read operations. Similarly, the write history buffer 112 includes a moving window history of one or more data addresses accessed by the processor 10 during write operations.

In some examples, the read history buffer 110 may include five read data addresses, and write history buffer 112 may include three write data addresses. Each history buffer operates in a first-in, first-out manner. Thus, each current read data address updates the read history buffer 110, and the oldest entry in the read history buffer 110 is replaced. Similarly, each current write data address updates the write history buffer 112, and the oldest entry in the write history buffer 112 is replaced. Each history buffer is a moving window history in the sense that it contains one or more of the most recent data addresses accessed by the processor and is updated by each new read or write data address, as appropriate.

The buffer memory unit 100 can be any memory device that is capable of storing previous data addresses and logic for keeping track of which element in the memory device is to be replaced when the history is updated. In one embodiment, the memory unit 100 is implemented as a FIFO (first-in, first-out) buffer.

The compression circuit 102 receives each current data address and the corresponding read/write signal. The compression circuit 102 outputs a compressed data address based on each current data address and the contents of the corresponding history.

According to the compression technique, a moving window history of previous data addresses is maintained, such that the nth access address A[n] is compared to the addresses in the history, and a difference is computed. Next, the index K of the entry in the history which minimizes the absolute value of the difference is determined. Then, the index K and the signed minimum difference D[K], rather than address A[n], are output and recorded. The sign of the difference is maintained in order to specify whether the current data address is higher or lower than the address in the history. A 32-bit address A[n] requires four bytes per access. By contrast, it has been found that a history containing four previous data addresses permits 70 percent of accesses to be encoded in six bits.

Figure 6:
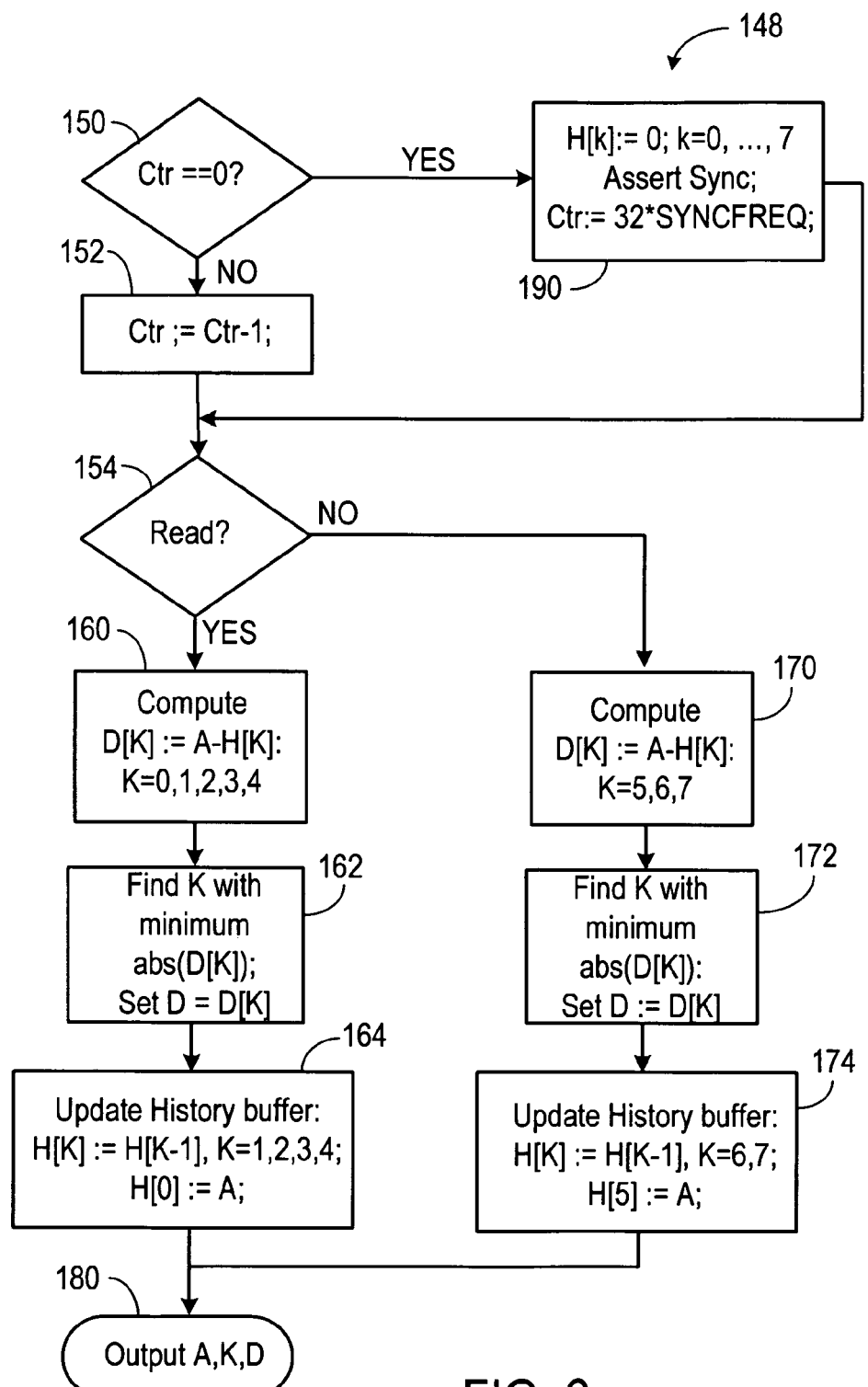
FIG. 6 is a flow diagram of an example process for performing history-based compression.

Referring to FIG. 6, a process 148 for compressing data addresses using a moving window history includes the steps described below. For example, the process 148 can be implemented by the history-based compression block 40. In step 150, a count in a counter is tested. If the counter has not reached zero, the counter is decremented in step 152. In step 154, a current data address is identified as a read address or a write address, based on the read/write input signal. In the case of a read address, a difference D[K] is computed for each entry in the read history buffer 110 as follows.

$$D[K]=A-H[K] \qquad (1)$$

for k=0, 1, 2, 3, 4, where A is the current read address, H[K] is an entry in read history buffer 110 and K is an index of an entry in read history buffer 110. In this example, because the read history buffer includes five read addresses, the index K is selected to have a range from 0 to 4 for read accesses.

In step 162, the index K of the read history buffer entry with the minimum absolute difference D[K] is determined, and the difference D is set to D[K], including the sign of the difference. In step 164, the read history buffer 110 is updated. Each entry in the read history buffer 110 is shifted by one position and the current address A is written to the lowest order location. In effect, the current address replaces the oldest entry in the read history buffer 110.

In the event of a write access, as determined in step 154, a difference D[K] is computed for each entry in the write history buffer 112 in accordance with equation (1) above for k=5, 6, 7, where A is the current write address, H[k] is an entry in write history buffer 112, and K is an index of an entry in the write history buffer 112. In this example, because the write history buffer includes 3 write addresses, the index K is selected to have a range from 5 to 7 for write accesses. The range of value of the index K for read accesses does not overlap the range of value of the index K for write accesses, so it is possible to determine whether a data address is associated with a read access or a write access based on the index K.

In step 172, the index K of the write history buffer entry with the minimum absolute difference D[K] is determined, and the difference D is set to D[K], including the sign of the difference. In step 174, the write history buffer 112 is updated by replacing the oldest entry with the current address A. In step 180, the values of the current address A, the minimum signed difference D, and the index K corresponding to the minimum absolute difference are output. The current address A is output for cases where the computation of the minimum absolute difference does not result in compression.

In the event that the counter value in step 150 is zero, the history buffers 110 and 112 are cleared in step 190. In addition, a synchronization sequence is output. The frequency of the synchronization sequence can be programmable by a register SYNCFREQ. The history buffers are cleared and a synchronization sequence is sent every N*SYNCFREQ accesses, where N is an integer, e.g., N=32.

The history buffers 110 and 112 may each include a number of previous data addresses that is different from the examples given above. In general, each history buffer includes one or more previous data addresses. In the limiting case of one previous data address in each history buffer, the calculated difference is the minimum difference. The compression performance may be affected by the number of entries in each history buffer. In some implementations, three to five entries in each history buffer can provide acceptable performance.

The range of the index K may change according to the number of previous data addresses in the history buffers 110 and 112. For example, if the read history buffer 110 stores 10 read address and the write history buffer 112 stores 6 write address, the index K can be in a range from 0 to 9 for read accesses and 10 to 15 for write accesses.

FIG. 7A shows an example listing 210 of an input trace of addresses sent to the address filtering block 30. FIG. 7B shows an example listing 220 of addresses in a buffer in the history compression block 40. The entries 222 in the listing 220 correspond to addresses 212 in the listing 210. Each of the addresses 212 is the same as the previous address, so the entries 222 each show a difference of 0. The history-based compression relies on the characteristic that successive accesses can have a spatial relationship to each other. This increases the chances that an incoming address can be represented using an index and a difference, instead of the original address. For example, the original address can have 32 bits, and the index and the different together can have less than 32 bits. The output of the history-based compression block 40 is sent to the interval-based compression block 50.

The interval-based compression block 50 takes the index and difference and tries to represent them as packets (groups of indexes and differences). FIGS. 7C and 7D show an example listing 230 of addresses stored in a buffer memory of the interval-based compression block 50. In this example, the buffer memory has 8 entries. Shown in FIGS. 7C and 7D are values of the parameters i, index K, difference D, address A, G, H, length L, and position P that are determined using, e.g., the process 190 of FIG. 3. Initially, the buffer 110 is empty (232). Then a first address is added to the first entry of the buffer 110 (234), and so forth.

The interval compression outputs are sent to the conversion-to-byte representation block 60, which encodes the information to separate the output on byte boundaries. In this example, the worst-case 32-bit address is padded with additional information to be output as five bytes. This allows an output module (not part of the data trace module 20) the flexibility of outputting the compressed trace through the pads through an interface of, e.g., 8, 16, 24, 32, or 40 pins.

FIG. 7E shows an example listing 240 of byte-sized packets after the addresses have been processed by the history-based compression block 40, the interval-based compression block 50, and the conversion-to-byte representation block 60. Comparing the listings 240 and 210 shows that the byte-sized packets use less bits to represent the addresses than the input trace.

After the trace is sent outside the chip, the information sent out is reconstructed for analysis and debug. For example, if a core having the processor 10 is designed to achieve a specified performance range, and an application executing on the processor 10 has a performance outside of the specified performance range, it would be useful to know what caused the low performance. The compressed stream 22 from the data trace module 20 can be analyzed using software that interprets the compressed stream 22 using the same algorithm for compression but applied in reverse. For example, one can decode the bytes, decompress the stream, and reconstruct the trace. FIG. 7F shows an example listing of packets that are reconstructed from the byte-sized packets. The reconstructed packets indicate the addresses that were accessed and can be further analyzed to optimize the performance of the system.

Although various implementations have been described, other implementations are within the scope of the following claims. For example, the processing system 8 may include a main memory (e.g., dynamic random access memory). When the data required by the processor 10 is not present in either the data cache memory 12 or the L2 memory 14, the processor 10 accesses the required data from the main memory. The data trace module 20 can generate a synchronization (SYNC) signal (e.g., 22 in FIG. 2) to allow a trace that has been interrupted (e.g., due to loss of data at an interface or due to excessive bandwidth requirements) to continue from a known starting point. The SYNC signal can be a re-synchronization point for a producer of addresses and a consumer of the data address trace. In some examples, the data trace module 10 can operate in a mode where a stall from the data trace module 10 stalls accesses from the processor 10 and thereby provide a slowed loss-less trace in a particular mode of operation. For example, the data trace module 20 can send a stall signal to the processor 10 when the data trace module 10 receives more data than can be processed by the data trace module 10.

The data trace module 20 can generate the SYNC signal based on a count value of a counter, so that a SYNC signal is generated periodically every predetermined number of data accesses. In some examples, generating the SYNC signal may interrupt the processing (e.g., compressing) of the data addresses. The data trace module 20 can wait until there is a pause in the incoming stream of data addresses, then generate a SYNC signal so as to reduce the disruption of the processing of the data addresses. In some examples, the data trace module 20 includes a buffer (e.g., a first-in-first-out buffer) placed after the address filtering block 30 to store the incoming data addresses. The buffer can have, e.g., 4 entries. The data trace module 20 can send a SYNC signal when the buffer overflows, indicating that the data trace module 20 is not able to keep up with the incoming address stream. Upon sending the SYNC signal, the data trace module 20 re-starts the trace gathering and compression.

In the example of FIG. 2, the data trace module 20 compresses the data addresses using a history-based compression (e.g., using block 40) and an interval-based compression (e.g., using block 50). When an interval-based compression is used, a sequence of data addresses is represented as {L, P} as described above, and it may be difficult to send additional address specific information (i.e., information specific to a particular address within the interval). The address-specific information can include, e.g., whether the address access resulted in a hit or a miss, whether the access is a cache control access, and/or the type of cache control access, etc.

In some implementations, the data trace module 20 provides an option of turning off the interval-based compression. For example, the data trace module 20 can be selectable between a first state in which the data addresses are compressed using a history-based compression and an interval-based compression, and a second state in which the data addresses are compressed using the history-based compression but not the interval-based compression. By using history-based compression only, the data trace module 20 can output address-specific information along with the compressed address stream. In some implementations, a compression unit that is external to the data trace module 20 can be used to compress the addresses. Some external compression units may perform better than the interval-based compression. The external compression unit may not perform well when interval-based compression is used because information about some addresses is not available without reconstruction of the compressed data. It may be useful to turn off the interval-based compression in this situation.

In some implementations, in a multi-core system, a first core may have a first processor operating at a first frequency (e.g., 400 MHz) and a first data trace module that traces data addresses accessed by the first processor. There may be a second core having a second processor operating at a second frequency (e.g., 250 MHz) and a second data trace module that traces data addresses accessed by the second processor. Having the data trace modules directly on chip within the same integrated circuit as the processors allows the high bandwidth data accesses of the processors operating at different frequencies to be traced. Alternatively, in some examples, a data trace module may trace the addresses accessed by multiple processors.

Various forms of the flows shown above may be used, with steps re-ordered, added, or removed. Various implementations of the systems and techniques described here can be realized in digital electronic circuitry, integrated circuitry, specially designed ASICs (application specific integrated circuits), computer hardware, firmware, software, and/or combinations thereof. Also, although several applications and methods have been described, it should be recognized that numerous other applications are contemplated.

What is claimed is:

1. A method for tracing data addresses, comprising:
   maintaining a moving window history of two or more previous data addresses accessed by a processor, the two or more previous data addresses in the history each being associated with an index that represents the position of the previous data address in the window history;
   determining a minimum absolute difference between a current data address and the two or more previous data addresses in the moving window history; and
   providing, as a representation of the current address, the minimum absolute difference and its sign, and the index associated with one of the two or more previous data addresses in the history.

2. The method of claim 1, wherein maintaining a moving window history comprises maintaining a read history of one or more previous read data addresses accessed by the processor.

3. The method of claim 2, wherein determining the minimum absolute difference comprises determining a minimum absolute difference between a current read data address and the previous read data addresses in the moving window history.

4. The method of claim 1, wherein maintaining a moving window history comprises maintaining a write history of one or more previous write data addresses accessed by the processor.

5. The method of claim 4, wherein determining the minimum absolute difference comprises determining a minimum absolute difference between a current write data address and the previous write data addresses in the moving window history.

6. The method of claim 1, wherein maintaining a moving window history comprises storing the previous data addresses in a first-in, first-out buffer.

7. The method of claim 1, wherein determining the minimum absolute difference comprises calculating an absolute difference between the current data address and each of the two or more previous data addresses in the history, and selecting the minimum absolute difference from the calculated absolute differences.

8. The method of claim 1, further comprising updating the moving window history.

9. The method of claim 8, wherein updating the moving window history comprises adding the current data address to the history and removing an oldest previous data address from the history.

10. A method comprising:
    receiving memory addresses that are accessed by a processor;

performing a history-based compression of the memory addresses to generate first compressed addresses;

performing an interval-based compression to compress the first compressed addresses to generate second compressed addresses; and outputting the second compressed addresses;

wherein compressing the first compressed addresses comprises identifying a second sequence of accesses that is a repeat of a first sequence of accesses, determining a length of the second sequence of accesses, and determining a starting point of the second sequence of accesses relative to the first sequence of accesses.

11. The method of claim 10 in which performing the history-based compression comprises determining a difference between a current address and a previous address, and outputting the difference as a representation of the current address.

12. The method of claim 10 in which performing the history-based compression comprises maintaining a history of at least one previous address accessed by the processor, determining a minimum difference between a current address and the at least one previous address, identifying an index associated with the previous address, and outputting the difference and the index as a representation of the current address.

13. The method of claim 10 in which performing the history-based compression comprises:

maintaining a history of at least one previous address accessed by the processor, determining a minimum difference D between a current address A and the at least one previous address, and determining an index K associated with the previous address.

14. The method of claim 13 in which performing the history-based compression comprises reducing the values of an address A, a difference D, and an index K into byte-sized packets, outputting the difference D and index K as a representation of the address A if the number of bits needed to represent D is less than a threshold, and outputting the address A if the number of bits needed to represent the difference D is above the threshold.

15. The method of claim 13 in which performing the interval-based compression comprises:

examining addresses represented as a sequence of packets {K, D} and identifying a second sequence of accesses that is a repeat of a first sequence of accesses, identifying a length L of the second sequence of accesses, and identifying a starting point P of the second sequence of accesses relative to the first sequence of accesses.

16. An apparatus for tracing data addresses, comprising:

a buffer memory to maintain a moving window history of two or more previous data addresses accessed by a processor, each of the two or more previous data addresses in the history being associated with an index that represents the position of the previous data address in the window history; and a compression circuit to determine a minimum absolute difference between a current data address and the two or more previous data addresses in the moving window history, and to provide, as a representation of the current data address, the minimum absolute difference and its sign, and the index associated with one of the two or more previous data addresses in the history.

17. The apparatus of claim 16, wherein the memory device includes a read history buffer to maintain a read history of one or more previous read data addresses.

18. The apparatus of claim 17, wherein the compression circuit is configured to determine a minimum absolute difference between a current read data address and the previous read data addresses in the read history buffer.

19. The apparatus of claim 16, wherein the memory device includes a write history buffer to maintain a write history of one or more previous write data addresses.

20. The apparatus of claim 19, wherein the compression circuit is configured to determine a minimum absolute difference between a current write data address and the previous write data addresses in the write history buffer.

21. The apparatus of claim 16, wherein the memory unit comprises a first-in, first-out buffer.

22. The apparatus of claim 16, wherein the compression circuit is configured to calculate an absolute difference between the current data address and each of the two or more previous data addresses in the history and to select the minimum absolute difference from the calculated absolute differences.

23. The apparatus of claim 16, wherein the compression circuit is configured to update the moving window history.

24. The apparatus of claim 16, wherein the compression circuit is configured to update the moving window history by adding the current data address to the history and removing an oldest previous data address from the history.

25. An apparatus comprising:

a memory device having addresses;

a processor to access the addresses in the memory device; and a data trace module to compress the addresses accessed by the processor;

wherein the data trace module comprises a history based compression unit and an interval based compression unit, the history based compression unit is configured to compress the addresses accessed by the processor to generate first compressed addresses, and the interval based compression unit is configured to compress the first compressed addresses to generate second compressed addresses by identifying a second sequence of accesses that is a repeat of a first sequence of accesses, determining a length of the second sequence of accesses, and determining a starting point of the second sequence of accesses relative to the first sequence of accesses.

26. The apparatus of claim 25 in which the data trace module comprises a history based compression unit that determines a difference between a current address and a previous address, and outputs the difference as a representation of the current address.

27. The apparatus of claim 25 in which the data trace module comprises a history based compression unit that determines a minimum difference between a current address and the at least one previous address, identifies an index associated with the previous address, and outputs the difference and the index as a representation of the current address.

28. The apparatus of claim 25 in which the data trace module comprises an interval based compression unit that identifies a second sequence of accesses that is a repeat of a first sequence of accesses, and outputs a first value and a second value to represent the second sequence of accesses, the first value representing a length of the second sequence of accesses and the second value representing a starting point of the second sequence of accesses.

29. An apparatus comprising:
an integrated circuit comprising
a processor; and
a data trace module to trace data addresses accessed by the processor and generate an output representing the data addresses;
wherein the data trace module is configured to maintain a moving window history of two or more previous data addresses accessed by the processor, the two or more previous data addresses in the history each being associated with an index that represents the position of the previous data address in the window history,
determine a minimum absolute difference between a current data address and the two or more previous data addresses in the moving window history, and
provide, as a representation of the current address, the minimum absolute difference and its sign, and the index associated with one of the two or more previous data addresses in the history.

30. The apparatus of claim 29 in which the integrated circuit comprises a memory, and the data trace module traces data addresses of the memory accessed by the processor.

31. The apparatus of claim 29, further comprising a storage external to the integrated circuit, and the data trace module traces data addresses of the external storage accessed by the processor.

32. The apparatus of claim 31 in which the external storage comprises at least one of dynamic random access memory, static random access memory, and flash memory.

33. The apparatus of claim 31 in which the data trace module compresses the data addresses, and the output of the data trace module comprises compressed data addresses.

34. The apparatus of claim 33 in which the data trace module compresses some of the data addresses using a history-based compression by comparing a difference between a current data address and a previous data address, and using the different to represent the current data address.

35. The apparatus of claim 33 in which the data trace module compresses some of the data addresses using an interval-based compression by matching a current sequence of data addresses with a previous sequence of data addresses, and using a length of the current sequence of data addresses and an offset between the current and previous sequences of addresses to represent the current sequence of addresses.

36. The apparatus of claim 33 in which the data trace module compresses some of the data addresses into byte-size packets.

37. The apparatus of claim 33 in which the data trace module is selectable between a first state in which the data addresses are compressed using a history-based compression and an interval-based compression, and a second state in which the data addresses are compressed using the history-based compression without the interval-based compression.

38. The apparatus of claim 29 in which the data trace module provides a complete trace of all data addresses accessed by the processor.

39. The apparatus of claim 29 in which the data trace module comprises a buffer to temporarily store the data addresses accessed by the processor.

40. The apparatus of claim 39 in which the data trace module comprises a buffer to temporarily store the data addresses input to the data trace module, the data trace module performing lossy compression of the data addresses when the buffer overflows.

41. The apparatus of claim 39 in which the data trace module comprises a buffer to temporarily store the data addresses input to the data trace module, the data trace module generating a synchronization signal when the buffer overflows.

42. The apparatus of claim 29 in which the data trace module stalls the processor when there are more data addresses than can be processed by the data trace module.

43. The apparatus of claim 29 in which the data trace module generates a synchronization signal indicating a beginning of a segment of data addresses.

44. The apparatus of claim 29 in which the data trace module generates a synchronization signal based on a counter value and a determination that a pause occurred in the data addresses input to the data trace module.

45. The apparatus of claim 29, in which the processor and the data trace module are located in a same core in the integrated circuit, the processor operating at a first frequency, wherein the integrated circuit comprises a second core having a second processor operating at a second frequency and a second data trace module to trace data addresses accessed by the second processor.

46. A method for tracing data addresses accessed by a processor, comprising:
maintaining a moving window history of previous data addresses accessed by the processor, each of the previous data addresses in the history having an index that represents the position of the previous data address in the window history;
determining a minimum absolute difference between a current data address and two or more of the previous data addresses in the history; and
providing, as a representation of the current data address, the minimum absolute difference and its sign, and a corresponding index.

47. A method for tracing data addresses, comprising:
maintaining a moving window history of at least two previous data addresses accessed by a processor, the at least two previous data addresses in the history each being associated with an index that represents the position of the previous data address in the window history;
for each previous data address in the moving window history, determining a difference between a current data address and the previous data address;
selecting one of the previous data addresses based on the differences between the current data address and the previous data addresses; and
providing, as a representation of the current address, the index associated with the selected previous data address, and the difference between the current address and the selected previous data address.

48. The method of claim 47 in which selecting one of the previous data addresses comprises selecting one of the previous data addresses that minimizes the absolute difference between the current data address and the previous data address.

* * * * *

UNITED STATES PATENT AND TRADEMARK OFFICE
CERTIFICATE OF CORRECTION

PATENT NO. : 8,316,214 B2
APPLICATION NO. : 12/106251
DATED : November 20, 2012
INVENTOR(S) : Li Lee, Ramesh Jandhyala and Srikanth Kannan It is certified that error appears in the above-identified patent and that said Letters Patent is hereby corrected as shown below:

Claim 34, column 15, line 37, delete "different" and insert -- difference --.

Signed and Sealed this
Nineteenth Day of February, 2013

Teresa Stanek Rea
*Acting Director of the United States Patent and Trademark Office*